March 19, 1929.  C. W. DAKE  1,705,720
TURBINE
Original Filed June 5, 1924   3 Sheets-Sheet 1
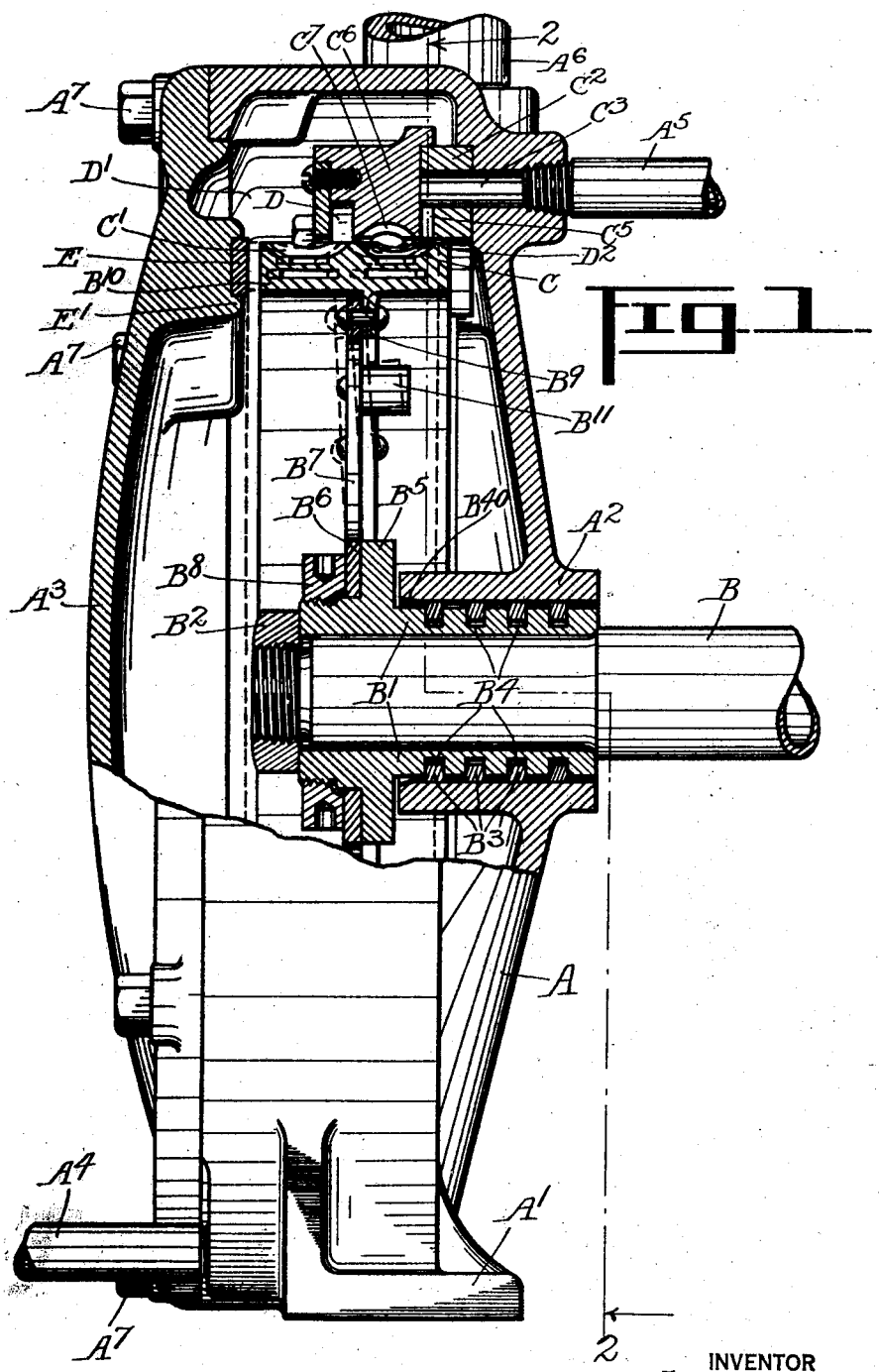

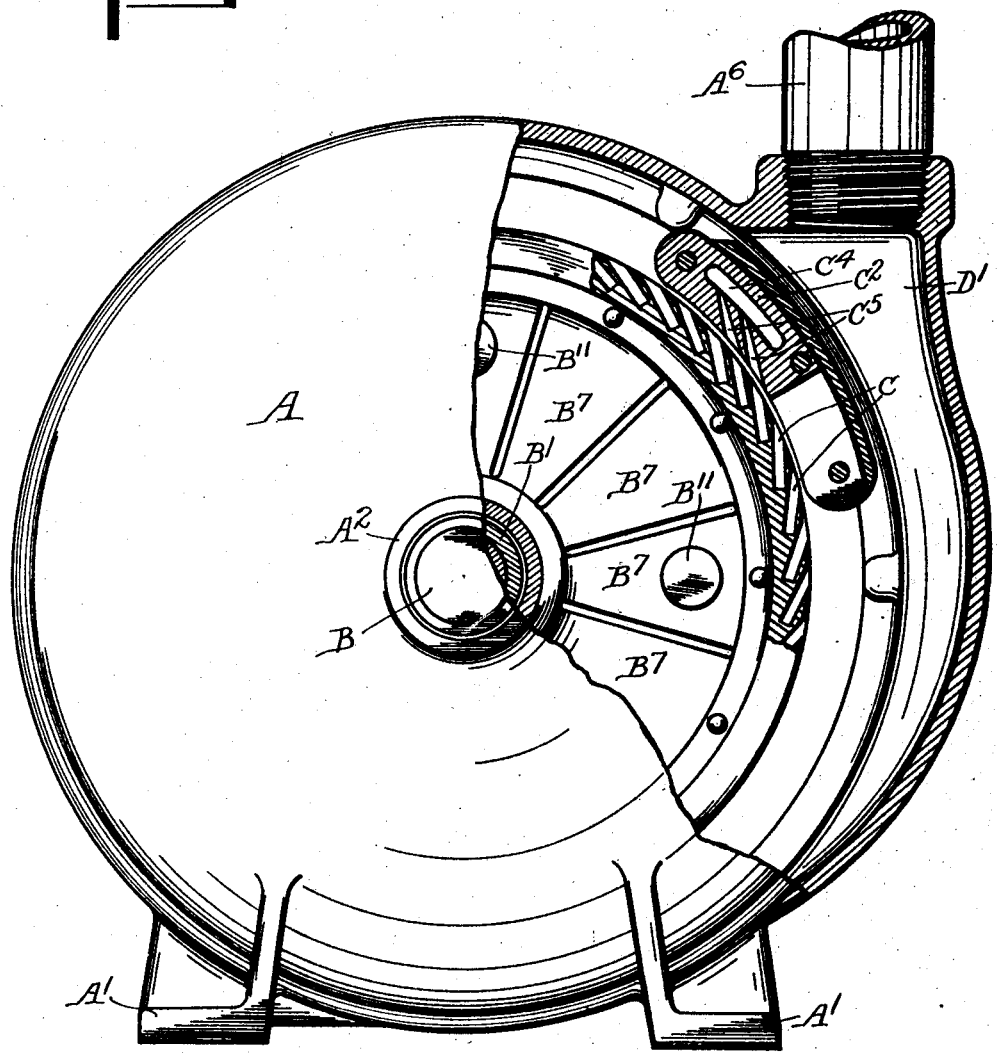

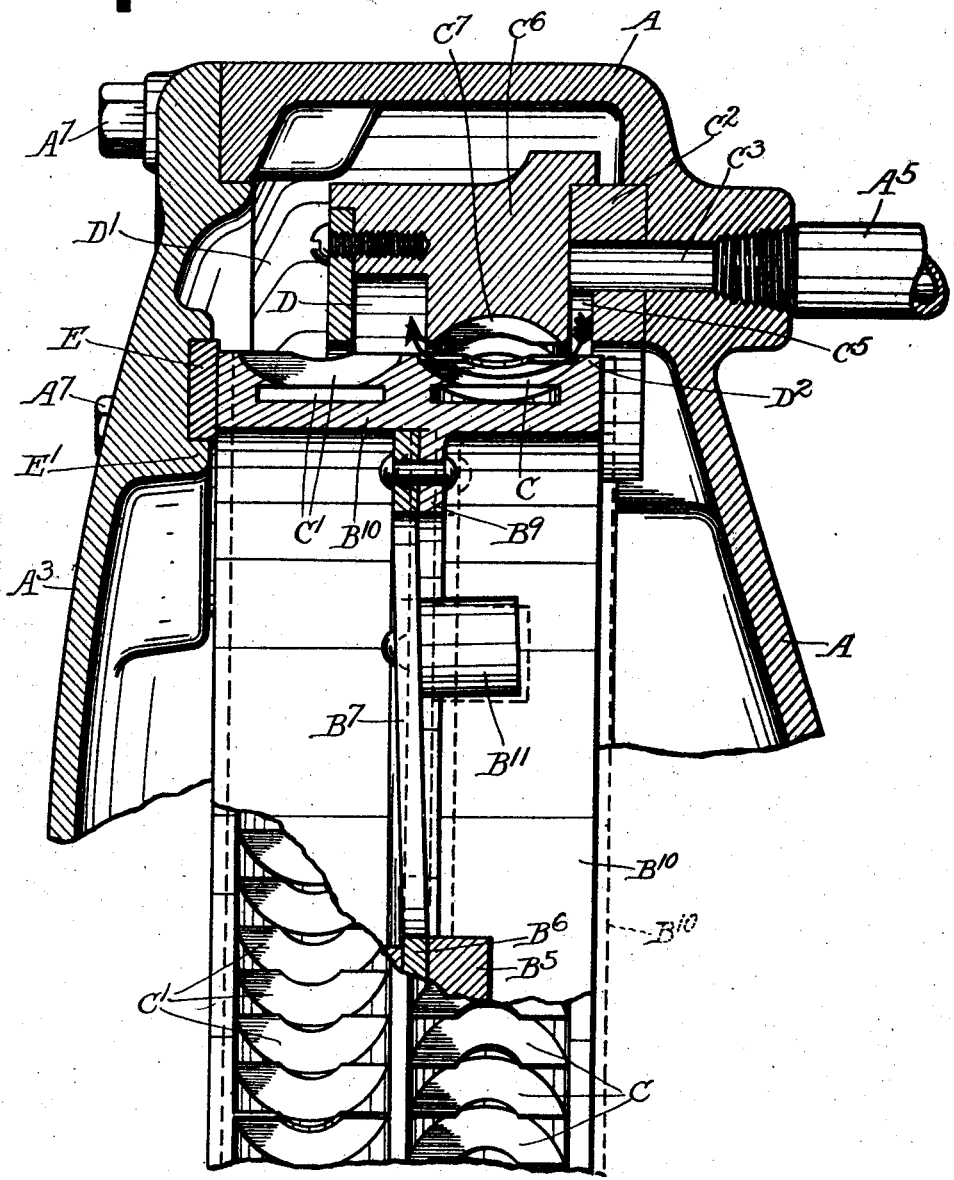

Patented Mar. 19, 1929.

1,705,720

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

TURBINE.

Original application filed June 5, 1924, Serial No. 717,917. Divided and this application filed January 30, 1926. Serial No. 84,829.

My invention relates to improvements in turbines, primarily intended for use in connection with steam or other elastic fluid. It has for one object to provide a new and improved type of self-governing turbine. Another object is to provide a turbine whereby the speed of the turbine is positively checked by an automatic arrangement when the speed exceeds a predetermined point, thus not only limiting excess speeds but positively tending to reduce the speeds back to the normal when the normal has been exceeded. Another object is to provide a turbine wheel which itself serves as a governor and wherein unbalanced weights on the wheel actually bend the wheel web to give the governing action. Other objects will appear from time to time throughout the specification and claims.

My invention is illustrated more or less diagrammatically in the accompanying drawings, wherein—

Figure 1 is a side elevation in part section along an axial line;

Figure 2 is a front elevation in part section along the line 2—2 of Figure 1;

Figure 3 is a detail section of the wheel showing the parts in full lines.

Like parts are indicated by like characters throughout the specification and drawings.

A is a generally cylindrical turbine housing having feet $A^1$ by which the housing may be attached to any suitable support. $A^2$ is a packing gland centrally disposed in the slightly coned web of the housing. $A^3$ is a cover closing the housing, $A^4$ a drain pipe for discharging condensation from the housing, $A^5$ is the steam or motive fluid supply pipe and $A^6$ is the exhaust pipe. The cover is held in position on the housing by means of the holding bolts $A^7$.

B is the turbine shaft, it is preferably supported in bearings not here shown so as to be substantially concentric with the packing sleeve $A^2$. $B'$ is the turbine hub mounted on the shaft B and held in place thereon by the nut $B^2$. $B^3$ $B^3$ are packing rings carried in slots $B^4$ in the outer face of the hub $B^1$ engaging the inner wall of the packing sleeve $A^2$ which sleeve is chamfered at $B^{40}$ to permit the insertion of the hub from the left as shown in Figure 1. The hub $B^1$ is flanged as at $B^5$ and carries a wheel web $B^6$ made up of a series of separate segments $B^7$ preferably stamped or otherwise made from thin spring steel. These segments may be separate at their inner or outer peripheries or may be joined together or may be separated intermediate their peripheries. At their inner periphery they engage the flange $B^5$ being held thereagainst by the ring $B^8$ threaded on the hub $B^1$ and clamped thereby rigidly in position. At their outer peripheries they are bolted to an inwardly extending flange $B^9$ on the turbine wheel rim $B^{10}$. Some or all of these segments $B^7$ have projecting from one side rigidly mounted weights $B^{11}$ which overhang beyond the point of support of the inner periphery of the wheel.

The wheel rim has on its outer periphery, two parallel series of buckets, the buckets C being normally driving buckets, the buckets $C^1$ being reverse buckets adapted to work in the opposite direction. These buckets are all of them inclined to the face of the wheel and to a radius of the wheel and have curved bottoms whereby the steam flowing into the bucket at one side of the wheel comes out of the other side in the opposite direction having reversed its flow in the usual manner. $C^2$ is a nozzle block supplied with steam from the pipe $A^5$ through the passage $C^3$. This passage $C^3$ discharges into a tangential passage $C^4$ from which lead exhausts $C^5$ $C^5$ discharging the steam against the buckets C. $C^6$ is a return passage block containing return passages $C^7$ $C^7$ adapted to receive the steam from the buckets C and return it again to those buckets so that the steam in its passage from the nozzle through the working buckets and return passages makes a number of complete revolutions on a spiral path gradually giving up its power to the buckets.

This will continue as long as the parts are in the position shown in Figure 1. The steam rushing in on one side of the bucket and flowing out on the other side through the return passage and so on. If, however, the bucket wheel be moved laterally into the position shown in Figure 3, some of the steam instead of being discharged from the bucket into the return passage will be discharged into the reversing passage D which is formed in the return passage block $C^6$. This steam will have its direction reversed in that passage and will be discharged against the reverse buckets $C^1$ being thence discharged into the exhaust chamber $D^1$ in the housing. Thus this steam tending to work against the normal driving of the wheel will check its velocity and tend to reduce its speed.

The unbalanced projecting weights $B^{11}$ rigidly mounted on the spring and segments $B^7$ serve to shift the wheel rim laterally to change the steam flow and ultimately to exert a braking action. At normal speeds the spring segments making up the central web of the wheel hold the wheel in line with the nozzle and forward buckets. As the speed exceeds a predetermined rate, the unbalance of these weights tends to bend the web from the position shown in Figure 1 toward the position shown in Figure 3. This bending of the web or of the segments making it up moves the wheel laterally and accomplishes the desired regulating result. As soon as the speed drops down the spring of the wheel tends to resist the tilting action of the weights and returns the wheel and buckets to the normal running position.

The filler ring E is set into an annular rib $E^1$ on the inner face of the cover $A^3$ to limit the lateral movement of the wheel and provide a renewable friction surface which may be engaged by the edge of the wheel if the action of the weights becomes sufficient to throw the wheel that far. Under normal conditions, this friction ring will seldom come into action but it has a double function, namely, to limit the lateral movement of the wheel and to add a friction load calculated to retard the wheel and bring it back to a normal rotational speed.

I have shown my device applied to the governing of a steam turbine. It will be understood that the lateral extending unbalanced weights mounted on a flexible wheel member may be used for many various purposes where it is desired to laterally displace a moving part along its axis in response to changes in rotation either to operate a brake or a governor or change the relation of nozzles, or the like and while I have shown the weights mounted on relatively mounted spring segments, it will be understood that these segments may be so narrow as to be described as spokes or may be so mounted as to permit one spring disc to make up the entire wheel without departing in any way from my invention.

This application is a division of my copending application, Serial Number 717,917 filed June 5, 1924.

I claim:

1. A rotor comprising a hub, a rim and a flexible member joining them to form a wheel, weights rigidly mounted on and projecting laterally from such member and adapted to bend it under the influence of centrifugal force to laterally displace the rim.

2. A rotor comprising a hub, a rim and a flexible plate joining them to form a wheel, weights rigidly mounted on and projecting laterally from such plate and adapted to bend it under the influence of centrifugal force to laterally displace the rim.

3. A rotor comprising a hub, a rim and a plurality of flexible segments joining them to form a wheel, weights rigidly mounted on and projecting laterally from such segments and adapted to bend them under the influence of centrifugal force to laterally displace the rim.

4. A rotor comprising a hub, a rim and a plurality of flexible spokes joining them to form a wheel, weights rigidly mounted on and projecting laterally from such spokes and adapted to bend them under the influence of centrifugal force to laterally displace the rim.

5. A rotor comprising a hub, a rim and a plurality of flexible members joining them to form a wheel, a weight rigidly mounted on and projecting from one of said members and adapted to bend it.

6. A rotor comprising a hub, a rim and a plurality of flexible members joining them to form a wheel, weights rigidly mounted on and projecting from some of said members and adapted to bend it.

7. A rotor comprising a hub, a rim and a plurality of flexible members joining them to form a wheel, a weight rigidly mounted on and projecting from one of said members and adapted to bend it, said weight comprising slotted block riveted to one face of the member and projecting at right angles therefrom in a direction generally parallel with the axis of rotation.

8. A rotor comprising a hub, a rim and a plurality of flexible members joining them to form a wheel, weights rigidly mounted on and projecting from some of said members and adapted to bend it, said weights comprising slotted blocks riveted to one face of the members and projecting at right angles therefrom in a direction generally parallel with the axis of rotation.

Signed at Chicago county of Cook and State of Illinois, this 26th day of January, 1926.

CHARLES W. DAKE.